United States Patent
Li

(10) Patent No.: US 10,783,874 B2
(45) Date of Patent: Sep. 22, 2020

(54) METHOD AND APPARATUS FOR PROVIDING VOICE FEEDBACK INFORMATION TO USER IN CALL

(71) Applicant: SHANGHAI XIAOI ROBOT TECHNOLOGY CO., LTD., Shanghai (CN)

(72) Inventor: Bo Li, Shanghai (CN)

(73) Assignee: SHANGHAI XIAOI ROBOT TECHNOLOGY CO., LTD., Shanghai (CN)

( * ) Notice: Subject to any disclaimer, the term of this patent is extended or adjusted under 35 U.S.C. 154(b) by 29 days.

(21) Appl. No.: 16/136,910

(22) Filed: Sep. 20, 2018

(65) Prior Publication Data
US 2019/0019502 A1 Jan. 17, 2019

Related U.S. Application Data

(63) Continuation of application No. 15/145,363, filed on May 3, 2016, now Pat. No. 10,115,391.

(30) Foreign Application Priority Data

May 4, 2015 (CN) .......................... 2015 1 0221399

(51) Int. Cl.
*G10L 15/02* (2006.01)
*G10L 15/26* (2006.01)
(Continued)

(52) U.S. Cl.
CPC .............. *G10L 15/02* (2013.01); *G10L 15/04* (2013.01); *G10L 15/1815* (2013.01);
(Continued)

(58) Field of Classification Search
CPC ..... G10L 15/02; G10L 15/1815; G10L 15/04; G10L 15/26; G10L 2015/223;
(Continued)

(56) References Cited

U.S. PATENT DOCUMENTS 8,073,695 B1 12/2011 Hendricks et al.
8,929,517 B1 1/2015 Lavian et al.
(Continued)

FOREIGN PATENT DOCUMENTS

CN 201504266 U * 6/2010
CN 101609673 B 8/2012
(Continued)

OTHER PUBLICATIONS

First Chinese Office Action regarding Application No. 201510221399.0 dated Jun. 14, 2017. English translation provided.
(Continued)

*Primary Examiner* — Akelaw Teshale
(74) *Attorney, Agent, or Firm* — Harness, Dickey & Pierce, P.L.C.

(57) ABSTRACT

A method for providing a voice feedback information to a user in a call is provided, including: acquiring a text information obtained by conducting a voice recognition on a voice information of the user; identifying a menu item to be jumped to according to the text information and multiple menu items of other party in the call, where the menu item to be jumped to is away from a present menu item by at least two levels; jumping to the identified menu item; where identifying the menu item to be jumped to includes: selecting a portion of menu items having a higher matching degree with the text information from the multiple menu items according to a predetermined information; identifying a menu item to be jumped to from the selected portion of menu items or a remaining portion of menu items.

20 Claims, 2 Drawing Sheets

(51) Int. Cl.
*G10L 15/04* (2013.01)
*G10L 15/18* (2013.01)
*H04M 3/493* (2006.01)
*G10L 15/22* (2006.01)

(52) U.S. Cl.
CPC ........... *G10L 15/26* (2013.01); *H04M 3/4936* (2013.01); *G10L 15/22* (2013.01); *G10L 2015/223* (2013.01); *G10L 2015/225* (2013.01); *H04M 2201/40* (2013.01); *H04M 2203/551* (2013.01)

(58) Field of Classification Search
CPC .............. G10L 15/22; G10L 2015/225; H04M 3/4936; H04M 2203/551; H04M 2201/40
See application file for complete search history.

(56) References Cited

U.S. PATENT DOCUMENTS

| | | | |
|---|---|---|---|
| 2004/0122941 A1 | 6/2004 | Creamer et al. | |
| 2004/0141011 A1* | 7/2004 | Smethers | G06F 3/04892 715/810 |
| 2006/0285662 A1* | 12/2006 | Yin | H04M 7/0045 379/88.16 |
| 2008/0305815 A1* | 12/2008 | McDonough | H04M 1/72552 455/466 |
| 2009/0003539 A1* | 1/2009 | Baird | H04M 3/493 379/88.01 |
| 2009/0003548 A1* | 1/2009 | Baird | H04L 65/1079 379/88.18 |
| 2011/0161923 A1* | 6/2011 | Green | G11B 27/034 717/109 |
| 2013/0033643 A1 | 2/2013 | Kim et al. | |
| 2013/0325448 A1 | 12/2013 | Levien et al. | |
| 2014/0331264 A1 | 11/2014 | Schneiderman et al. | |
| 2014/0365203 A1 | 12/2014 | Waibel | |
| 2016/0027198 A1* | 1/2016 | Terry | G06F 16/00 345/473 |

FOREIGN PATENT DOCUMENTS

| | | |
|---|---|---|
| CN | 103000173 A | 3/2013 |
| CN | 104052883 A | 9/2014 |
| CN | 104375847 A | 2/2015 |

OTHER PUBLICATIONS

Second Chinese Office Action regarding Application No. 201510221399.0 dated Nov. 9, 2017. English translation provided.
Office Action regarding U.S. Appl. No. 15/145,363, dated Feb. 5, 2018.

* cited by examiner

| Menu level | Menu items | | | | | | | | |
|---|---|---|---|---|---|---|---|---|---|
| I | A | | | | | B | | | |
| II | A1 | | A2 | | | B1 | | B2 | |
| III | A11 | A12 | A21 | A22 | A23 | B11 | B12 | B21 | B22 |

METHOD AND APPARATUS FOR PROVIDING VOICE FEEDBACK INFORMATION TO USER IN CALL

CROSS-REFERENCE TO RELATED APPLICATIONS

The present application is a continuation application of U.S. patent application Ser. No. 15/145,363, filed May 3, 2016, which claims the benefit of priority to Chinese Patent Application No. 201510221399.0 titled "METHOD AND APPARATUS FOR PROVIDING VOICE FEEDBACK INFORMATION TO USER IN CALL", filed with the Chinese State Intellectual Property Office on May 4, 2015, the entire disclosure of which is incorporated herein by reference.

TECHNICAL FIELD

The disclosure generally relates to the computer technology field, and more particularly, to a method and an apparatus, applied to a computer equipment, for providing a voice feedback information to a user in a call.

BACKGROUND

In a conventional technology, users can acquire self-help voice services provided by suppliers through dialing a relevant service phone number. However, users can only choose a menu item step by step through pressing a button and following a voice prompt of a self-help voice service. For instance, if a user wants to recharge a mobile phone, he needs to perform the following steps. Firstly, dialing the relevant service phone number, then, listening to multiple menu items broadcasted by a voice prompt carefully (e.g., pressing a button 1 to enter an individual service, pressing a button 2 to enter a company service, etc.), then, selecting the button 1 to enter the individual service, then, continuously listening to multiple menu items broadcasted by a new voice prompt and making a selection, and repeating the aforementioned steps for several times till the recharge for the mobile phone is finished.

SUMMARY

The present disclosure provides a method and an apparatus, applied to a computer equipment, for providing a voice feedback information to a user in a call.

According to an aspect of the present disclosure, a method adapted to a computer equipment, for providing a voice feedback information to a user in a call is provided. The method may include: acquiring a text information obtained by conducting a voice recognition on a voice information of the user; identifying a menu item to be jumped to according to the text information in conjunction with a plurality of menu items of other party in the call, wherein the menu item to be jumped to is away from a present menu item by at least two levels; and jumping to the identified menu item, and sending the voice feedback information that corresponds to the menu item and is to be provided to the user; where identifying the menu item to be jumped to according to the text information in conjunction with the plurality of menu items of the other party in the call may include: selecting a portion of menu items from the plurality of menu items of the other party according to a predetermined information, where the portion of menu items are estimated to have a higher matching degree with the text information than a remaining portion of menu items in the plurality of menu items of the other party; determining whether at least one menu item matched with the text information can be identified from the selected portion of menu items; and if yes, identifying one of the at least one menu item as the menu item to be jumped to, or if not, identifying the menu item to be jumped to from the remaining portion of menu items.

According to an aspect of the present disclosure, an apparatus applied to a computer equipment, for providing a voice feedback information to a user in a call is also provided. The apparatus may include: an acquisition device, configured to acquire a text information obtained by conducting a voice recognition on a voice information of the user; a first identification device, configured to identify a menu item to be jumped to according to the text information in conjunction with a plurality of menu items of other party in the call, wherein the menu item to be jumped to is away from a present menu item by at least two levels; a feedback device, configured to jump to the identified menu item, and send the voice feedback information that corresponds to the menu item and is to be provided to the user; where the first identification device may include: a selection device, configured to select a portion of menu items from the plurality of menu items of the other party according to a predetermined information, where the portion of menu items are estimated to have a higher matching degree with the text information than a remaining portion of menu items in the plurality of menu items of the other party; a second sub identification device, configured to, determine whether at least one menu item matched with the text information can be identified from the selected portion of menu items, and identify one of the at least one menu item as the menu item to be jumped to when it is determined yes; and a third sub identification device, configured to, when it is determined by the second sub identification device that, a menu item matched with the text information cannot be identified from the selected portion of menu items, identify the menu item to be jumped to from the remaining portion of menu items.

Compared with the conventional technology, the present invention has the following benefits. 1) it is realized that freely jumping in the multiple menu items of the other party rather than being limited to only jump to a previous menu item of the present menu item or a sub-menu item of the present menu item, and moreover, since it can freely jump among the multiple menu items of the other party, it is possible to jump to a menu item matched with the text information and provide a correct voice feedback information to the user even if the present menu item does not match with the text information; 2) the menu item to be jumped to is identified more accurately by matching a semantic information for a segmented word of the text information with groups of semantic matching information; 3) a portion of menu items are firstly selected from the multiple menu items of the other party in the call according to a predetermined information, where the portion of menu items are estimated to be highly matched with the text information so as to narrow down the matching range, and thus the menu item to be jumped to is identified rapidly, and moreover, when the menu item matched with the text information is not identified from the portion of menu items, a matching range is enlarged or gradually enlarged to avoid matching errors; 4) furthermore, the menu item to be jumped to is identified by sending a voice inquiry information to the user, when multiple menu items matched with the text information are identified according to the text information, and moreover, due to there is an interaction with the user in the process, the identified menu item to be jumped is accurate; 5) finally, the text information can be supplemented according to a context information of the call, when it is determined that the menu item to be jumped to is not identified according to the text information, therefore, the supplemented text information can be understood clearly, and the menu item to be jumped to is identified more efficiently and accurately.

BRIEF DESCRIPTION OF THE DRAWINGS

The additional objects, features and advantages of the present invention are more apparent with reference to the accompanying drawings and the detailed description in the embodiments that follow, where the embodiments described are not meant to be limitation.

Throughout the accompanying drawings, the same or similar reference numbers should be understood to designate the same or similar features or functions.

DETAILED DESCRIPTION

In the following detailed description of the embodiments, reference is made to the accompanying drawings that form a part of the present disclosure.

Figure 1:
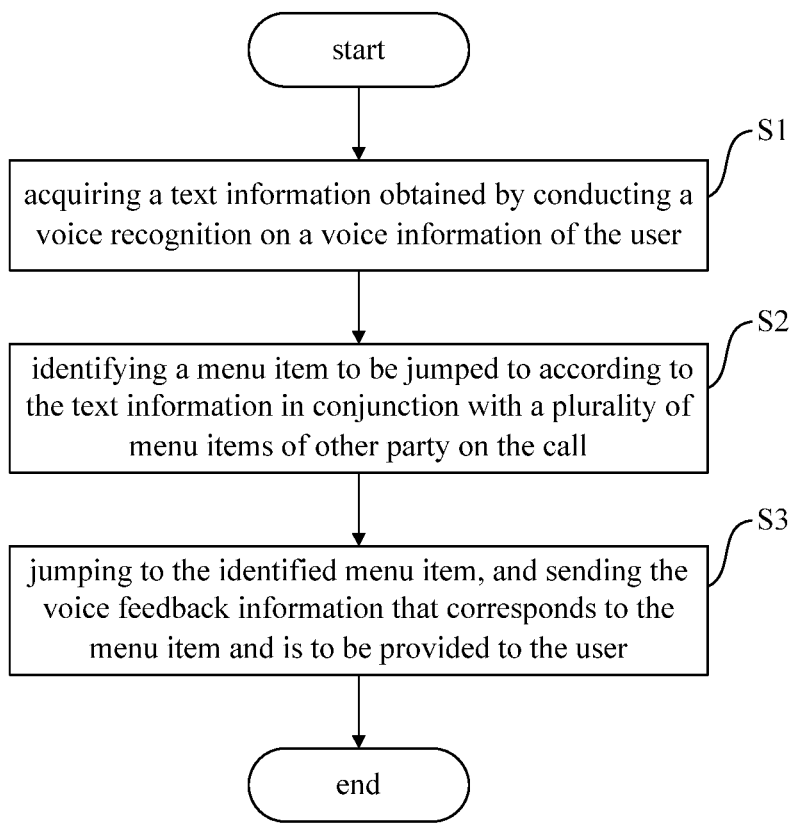
FIG. 1 schematically illustrates a flowchart of a method applied to a computer equipment, for providing a voice feedback information to a user in a call according to an embodiment of the present disclosure.

FIG. 1 schematically illustrates a flowchart of a method applied to a computer equipment, for providing a voice feedback information to a user in a call according to an embodiment of the present disclosure.

The present embodiment is mainly implemented by a computer equipment. The computer equipment may include but is not limited to a network equipment and a user equipment. The network equipment includes but is not limited to a single web server, a server group including a plurality of web servers, or a cloud based on cloud computation involving a large number of computers or web servers. The user equipment includes but is not limited to a Personal Computer (PC), tablet computer, smartphone, and Personal Digital Assistant (PDA), etc. A network that the computer equipment camps on includes but is not limited to the Internet, a wide area network, a metropolitan area network, a local area network and a Virtual Private Network (VPN) network, etc.

The computer equipment may provide a voice service between other party and the user in the call to the other party. The computer equipment may serve as the other party in the call directly, or may be connected to the other party in the call. Optionally, the other party in the call is a supplier providing services to the user, such as a telecommunication operator including the China Telecom, the China Unicom, the China Mobile, etc., or any other suppliers providing voice services to the user etc. Optionally, the multiple menu items of the other party in the call, or a hierarchical relationship between the multiple menu items may be pre-stored in the computer equipment, or in any other equipments with which the computer equipment is connected. The menu item may represent one item of the multiple menu items provided by the other party in the call to the user. For instance, the other party in the call is a telecommunication operator, then all of the menu items of the telecommunication operator are stored in the computer equipment.

Specifically, the computer equipment is for exemplary purpose only, and for any other computer equipments in prior arts or possibly presented in the future, if adapted to the disclosure, should be included within the protection scope of the present invention, and incorporated herein by reference.

A method according to an embodiment of the present disclosure includes a step S1, a step S2 and a step S3.

In the step S1, a computer equipment acquires a text information obtained by conducting a voice recognition on a voice information of a user.

Specifically, the method for acquiring the text information obtained by conducting the voice recognition on the voice information of the user by the computer equipment includes but is not limited to:

1) The computer equipment acquires the text information obtained by conducting the voice recognition on the voice information of the user, where the text information is provided by other equipments.

In some embodiments, the computer equipment does not serve as the other party in a call so as not to directly communicate with the user, and instead, other equipments serve as the other party in the call and directly communicate with the user. Other equipments receive the voice information from the user, conduct the voice recognition on the voice information to acquire the text information and send the text information to the computer equipment, thus the computer equipment directly receives the text information from the other equipments.

In some embodiments, the computer equipment serves as the other party in the call and communicates with the user directly. After receiving the voice information from the user, the computer equipment sends the voice information to other equipments. The other equipments conduct the voice recognition on the voice information to acquire the text information and send the text information to the computer equipment, thus the computer equipment receives the text information provided by the other equipments.

2) The computer equipment acquires the voice information from the user, conducts the voice recognition on the voice information and acquires a corresponding text information.

Specifically, the computer equipment may acquire the voice information from the user in a variety of ways. In some embodiments, the computer equipment is the other party in the call, and receives the voice information from the user directly. In some embodiments, the computer equipment receives the voice information of the user provided by the other party based on a connection between the computer equipment and the other party in the call.

Specifically, the computer equipment or other equipments may adopt a variety of voice recognition approaches to conduct the voice recognition on the voice information, and acquire the corresponding text information. For instance, the computer equipment may adopt Dynamic Time Warping (DTW) or simulation matching technique to conduct the voice recognition on the voice information to acquire the corresponding text information.

It is noted that the aforementioned examples are only for better illustrating the technical disclosure of the present invention rather than be limiting. One of ordinary skill in the art should understand, any implementation for acquiring a text information obtained by conducting a voice recognition on a voice information of a user, should be included in the scope of the present invention.

In the step S2, the computer equipment identifies a menu item to be jumped to, according to the text information in conjunction with multiple menu items of the other party in the call.

Wherein, the menu item to be jumped to is away from a present menu item by at least two levels.

Figures 2, 3:
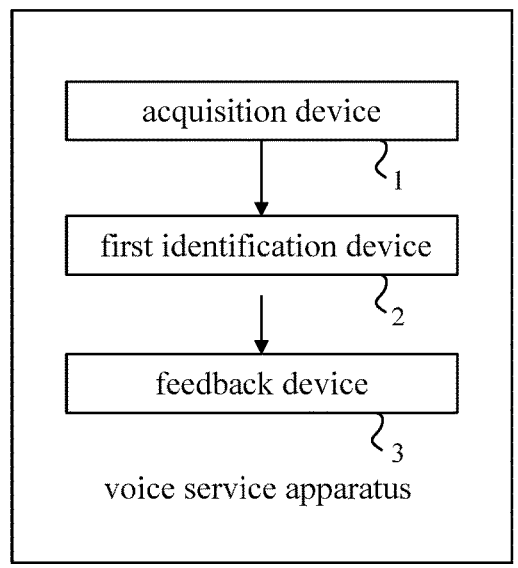
FIG. 2 schematically illustrates an apparatus applied to a computer equipment, for providing a voice feedback information to a user in a call according to an embodiment of the present disclosure.
FIG. 3 schematically illustrates multiple menu items of other party according to an embodiment of the present disclosure.

In some embodiments, FIG. 3 schematically illustrates multiple menu items of other party in a call according to an embodiment of the present disclosure. The multiple menu items of the other party are divided into three levels. The first level includes the following menu items: A, B. In the second level, the menu items A1, A2 are the sub-menu items of the menu item A, and the menu items B1, B2 are the sub-menu items of the menu item B. In the third level, the menu items A11 and A12 are the sub-menu items of the menu item A1, the menu items A21, A22 and A23 are the sub-menu items of the menu item A2, the menu items B11 and B12 are the sub-menu items of the menu item B1, and the menu items B21 and B22 are the sub-menu items of the menu item B2. The present menu item is A, and the menu item to be jumped to is B22, where the menu item to be jumped to is away from the present menu item by two levels.

The computer equipment may directly read the multiple menu items stored in a local storage, or the computer equipment acquires the multiple menu items stored in a non-local storage.

Optionally, when the other party in the call is a supplier providing services to the user, and the computer equipment may provide services to a plurality of suppliers, the computer equipment may identify the multiple menu items corresponding to the other party, according to a number information of the other party in the call.

The number information includes any information indicating the number of the other party in the call, for instance a phone number of the other party in the call, a serial number corresponding to the number of the other party in the call, etc.

In some embodiments, the user starts a call by dialing the phone number of the other party, and the computer equipment acquires the number information of the other party based on the connection between the computer equipment and the other party, and identifies multiple menu items corresponding to the number information as the multiple menu items corresponding to the other party.

Specifically, the implementing approach for identifying the menu item to be jumped to by the computer equipment, according to the text information in conjunction with the multiple menu items of the other party in the call includes but is not limited to:

1) The computer equipment matches the text information with the multiple menu items of the other party in the call directly, and identifying a menu item matched with the text information as the menu item to be jumped to.

In some embodiments, the computer equipment acquires a text information "recharge the local device" in the step S1, then the computer equipment directly matches the text information with the multiple menu items of the other party in the call, and identifies a menu item "local device recharge" with a highest matching degree as the menu item to be jumped to.

2) In the present implementation, the step S2 further includes a step S21-1 and a step S21-2.

In the step S21-1, the computer equipment performs a word segmentation on the text information, and acquires a semantic information for at least one segmented word.

The semantic information for the segmented word includes any information that can be recognized by a computer equipment and represent the semantics of the segmented word. Optionally, the semantic information for the segmented word includes but is not limited to at least one of the following items:

a) a synonym for the segmented word and/or a combination of synonyms for the segmented word.

In some embodiments, a semantic information for a segmented word "expense" includes a synonym "billing", a synonym "charge", etc.

b) a homogeneous word for the segmented word and/or a combination of homogeneous words for the segmented word.

The homogeneous word for the segmented word represents a word belonging to the same category as the segmented word.

As an example, if the segmented word is a geographical name, the homogeneous words for the segmented word may include other geographical names. For instance, a semantic information for a segmented word "Shanghai" may include "Beijing", "Tianjin", etc.

c) an entity with a same or similar structure to the segmented word.

The entity with the same or similar structure to the segmented word represents the information structure of the segmented word is the same or similar to the segmented word. Optionally, the entity may be an expression with a special semantics.

In some embodiments, the segmented word is a special time structure "At 10:45 on Jan. 1, 2013", then the entity with the same or similar structure to the segmented word may be a date semantic expression, such as "At XX(hour): XX(minutes) on XX(Month) XX(Day), XXXX(year)", etc. Such kind of expression with a special semantics may further include a personal name, an address, and a phone number, etc.

It is noted that the aforementioned examples are only to better illustrate the technical disclosure of the present invention, rather than limiting the invention. One of ordinary skill in the art should understand, any information that can be recognized by a computer equipment and adapted to express a semantics of a segmented word, should be included in the scope of the semantic information for the segmented word in the present invention.

Specifically, the computer equipment may adopt a variety of ways to perform the word segmentation on the text information to acquire the semantic information for at least one segmented word.

In some embodiments, the computer equipment may adopt a variety of ways (such as a string matching method, a semantic comprehension method etc.) to perform the word segmentation on the text information, and match the segmented word with a word corresponding to a previously acquired semantic information, and then identify a semantic information of a successfully matched word as the semantic information of the segmented word.

In some embodiments, as described in the aforementioned embodiment, after matching the segmented word with the word corresponding to the previously acquired semantic information, and identifying the semantic information of the successfully matched word, the method further includes: processing the semantic information of the successfully matched word in conjunction with a word context of the segmented word in the text information, so as to identify the semantic information of the segmented word etc.

Specifically, the computer equipment may acquire a semantic information for each segmented word in the text information, or the computer equipment may only acquire semantic information for a portion of segmented words in the text information. In particular, for some meaningless segmented words (such as "of", "and", etc.), the computer equipment may not acquire a semantic information for these segmented words.

In the step S21-2, the computer equipment matches the acquired semantic information with a semantic matching information for at least one of the multiple menu items of the other party in the call so as to identify the menu item to be jumped to.

The multiple menu items as well as the semantic matching information of the other party in the call are pre-stored in the computer equipment, where each menu item corresponds to a group of semantic matching information. Optionally, each group of semantic matching information includes one semantic matching structure or multiple semantic matching structures. Optionally, one semantic matching structure may be a positive semantic matching structure or a negative semantic matching structure. If the better the positive semantic matching structure is matched, the better a menu item corresponding to the positive semantic matching structure is matched. If the better the negative semantic matching structure is matched, the worse a menu item corresponding to the negative semantic matching structure is matched. The semantics expressed by the group of semantic matching information similar to each other.

One semantic matching structure may be expressed as a semantic expression. Optionally, the semantic matching structure includes but is not limited to at least one of the following items. a) multiple words and a semantic information for at least one word of the multiple words, where the semantic information for the at least one word is similar to the semantic information for the segmented word. In this case, no more description is provided. b) logical relationships between the multiple words, such as a sequential relationship, a constraint relationship (for instance a word is a modifier of another word) among the multiple words, etc.

In some embodiments, the group of semantic matching information includes the following three semantic matching structures "[what] [is] [ten yuan] [local] [data package]", "[what] [service] [is] [ten yuan] [local] [data package]" and "[query for] [ten yuan] [provincial] [data package] [service]". The content in each "[ ]" indicates a word and/or a semantic information for the word.

Optionally, a standard question may be applied to represent a natural language implication similar to all the semantic matching information in the group of semantic matching information. For instance, the standard question for the group of semantic matching information including three semantic matching structures in the aforementioned embodiment, may be "An introduction to the ten yuan data package". Optionally, the standard question may be applied to match with the acquired semantic information, or only be applied for the operator to comprehend the natural language implication similar to all the semantic matching information in the group of semantic matching information.

Specifically, the computer equipment may adopt a variety of ways to match the acquired semantic information with the semantic matching information for at least one of the multiple menu items of the other party in the call, to identify the menu item to be jumped to.

As an example, the computer equipment firstly selects at least one menu item from multiple menu items of other party (for instance selecting randomly, or selecting based on the semantic similarity between the menu item and the text information, etc.). Thereafter, for the at least one menu item, the computer equipment matches a semantic information of each segmented word with a semantic matching information corresponding to the at least one menu item, and identifies a menu item with a highest matching degree as a menu item to be jumped to.

In some embodiment, in the step S1, a computer equipment acquires a text information "How is the local data charged, please?". In the step S21-1, the computer equipment performs a word segmentation on a text information, and acquires a semantic information for a segmented word "local", a semantic information for a segmented word "traffic", a semantic information for a segmented word "charge". In the step S21-2, the computer equipment firstly identifies a menu item "data expense" and a menu item "provincial data expense", and thereafter, the computer equipment matches the semantic information for the above three segmented words with a group of semantic matching information for the menu item "data expense" and a group of semantic matching information for the menu item "provincial data expense", and identifies the menu item "provincial data expense" with a higher match degree as a menu item to be jumped to.

In another embodiment, in the condition that a voice information has been matched with a semantic matching information, a computer equipment may further perform the following steps. The computer equipment selects one menu item from multiple menu items that have not been matched with a semantic information for each segmented word (for instance selecting a menu item randomly, or selecting a sub-menu item of a menu item with a highest match degree in the matched menu items, etc.), and the computer equipment matches the semantic information for each segmented word with a semantic matching information for the one menu item, when a match degree is higher than a predetermined value, the computer equipment identifies the one menu item as a menu item to be jumped to, when the match degree is not higher than the predetermined value, the computer equipment repeats the aforementioned steps, until the menu item to be jumped to is identified.

The implementing approach 2) may supplement the semantics of the text information through a semantic comprehension. In addition, in the implementing approach 2), the multiple menu items also have the semantic matching information for expressing their semantics. Therefore the matching process in the present implementation is more accurate.

It is noted that, the aforementioned examples are for better illustrating the technical disclosure of the present invention, rather than be limiting the present invention. One of ordinary skill in the art should understand, any implementation for identifying a menu item to be jumped to according to a text information in conjunction with multiple menu items of other party in a call, should be included in the scope of the present invention.

Specifically, the step S2 may further include multiple embodiments. The multiple embodiments are presented below.

In a first embodiment, the step S2 may further include steps S22-1, S22-2, S22-3 and S22-4.

In the step S22-1, a computer equipment selects a portion of menu items from a plurality of menu items of other party according to a predetermined information, where the portion of menu items are estimated to have a higher matching degree with the text information than a remaining portion of menu items in the plurality of menu items of the other party.

The predetermined information may include any information that is predetermined and used to select the portion of menu items. Optionally, the predetermined information may include but is not limited to:

a) the text information acquired in the step S1.

Optionally, the better the semantics of the text information is matched with semantics of a menu item, the more likely the menu item is estimated to have a higher matching degree with the text information. Specifically, the computer equipment may directly perform a natural language analysis on the text information to identify the semantics of the text information quickly.

b) the present menu item of a call between a user and other party in the call.

In some embodiment, the identified menu item to be jumped to by analyzing the text information is related to the present menu item of the call. For instance, a text information is "next", "return to previous two levels", "I expect other similar service", etc. Then, a computer equipment may estimate a portion of menu items that have a higher matching degree with the text information according to a present menu item. In other embodiment, the computer equipment may estimate the portion of menu items that have a higher matching degree with the text information according to a hierarchical relationship among multiple menu items and/or historical menu items selected by a user during a call.

c) a menu level instruction information from the user. The menu level instruction information includes any information applied to indicate a menu level. For example, in the menu items shown in FIG. 3, a menu level instruction information from a user indicates to make a selection among multiple menu items in a second level. Specifically, if the predetermined information merely includes the menu level instruction information, the computer equipment may select all the menu items in a menu level indicated by the menu level instruction information as the portion of menu items. If the predetermined information further includes other information, the computer equipment may select a portion of menu items from the menu items in the menu level indicated by the menu level instruction information based on the other information.

Specifically, when the predetermined information includes the menu level instruction information, the present embodiment further includes performing a following step before the step S22-1: the computer equipment receiving the menu level instruction information from the user.

It should be noted that, the aforementioned predetermined information is for exemplary purpose only. One of ordinary skill in the art should understand that, other predetermined information that can be used to select a portion of menu items, should fall within scope of the predetermined information described in the present invention.

Specifically, the computer equipment may perform a semantics analysis to the predetermined information, estimate a matching degree between each of the plurality of menu items of the other party and the text information by performing a semantic matching between the each menu item of the other party and the predetermined information, and select a portion of menu items that are estimated to have a higher matching degree with the text information than a remaining portion of menu items from the plurality of menu items of the other party.

In some embodiments, a text information acquired in the step S1 is "What is the ten yuan data package", a present menu item is "provincial plan", then the computer equipment performs a semantics analysis to the text information and the multiple menu items, and matches the semantics of the text information with the semantics of each of the multiple menu items of the other party in the call, so that the menu items of "data plan" and "provincial data plan" that are estimated to have a higher matching degree with the text information are selected from the multiple menu items of the other party.

In some embodiments, the text information acquired in the step S1 is "How about the ten yuan local data package"; a menu level indicated by a menu level instruction information from a user includes the menu items of "Service process for the ten yuan provincial data package", "Introduction to the ten yuan provincial data package" and "Query for the using conditions of the ten yuan provincial data package". Then, in the step S22-1, the computer equipment may perform a semantics analysis to the text information and the menu level instruction information, and matches the text information with the aforementioned three menu items in the menu level indicated by the menu level instruction information, so as to select a portion of menu items i.e. "Introduction to the ten yuan provincial data package" and "Query for the using conditions of the ten yuan provincial data package", which are estimated to have a higher matching degree with the text information, from the three menu items.

In the step S22-2, it is determined whether at least one menu item matched with the text information can be identified from the selected portion of menu items. If yes, the method goes to the step S22-3, one of the at least one menu item matched with the text information is identified as the menu item to be jumped to.

In some embodiments, in the step S1, a text information "How about the ten yuan local data?" is acquired, in the step S22-1, a portion of menu items are selected which includes "Introduction to the ten yuan provincial data package" and "Query for the using conditions of the ten yuan provincial data package", and in the step S22-2, a menu item "Introduction to the ten yuan provincial data package" matched with the text information is identified from the portion of menu items based on the text information and the portion of menu items, thus in the step S22-3, the computer equipment identifies the menu item of "Introduction to the ten yuan provincial data package" as the menu item to be jumped to.

In some embodiment, determining whether at least one menu item matched with the text information can be identified from the selected portion of menu items may include: performing a word segmentation to the text information, acquiring a semantic information of at least one segmented word, and matching the semantic information of the at least one segmented word with a semantic matching information of each of the selected portion of menu items to determine whether there is at least one menu item matched with the text information.

In some embodiment, in the step S22-2, it is determined that a menu item matched with the text information cannot be identified from the selected portion of menu items, the method, then the method goes to the step S22-4.

In the step S22-4, the computer equipment may identify the menu item to be jumped to from the remaining portion of menu items in the plurality of menu items of the other party in the call according to the text information and the remaining portion of menu items.

The remaining portion of menu items may refer to menu items in the plurality of menu items of the other party in the call other than the selected portion of menu items.

As an example, FIG. 3 schematically illustrates a plurality of menu items of other party in a call. In the step S21-1, a portion of menu items selected by a computer equipment from the plurality of menu items are B11 and B12. In the step S22-2, when it is determined that a menu item matched with a text information cannot be identified from the menu items of B11 and B12, in the step S22-4, the computer equipment identifies a menu item to be jumped to from menu items except for the menu items of B11 and B12 according to the text information and the menu items except for the menu items of B11 and B12.

In some embodiment, in the step S22-4, the computer equipment may identify the menu item to be jumped to from the remaining portion of menu items in batches.

As another example, a plurality of menu items of other party in a call are shown in FIG. 3. In the step S21-1, a portion of menu items i.e. B11 and B12 are selected by a computer equipment from the multiple menu items. Then in the step S22-2, when it is determined that a menu item matched with the text information cannot be identified from the menu items of B11 and B12, in the step S22-4, the computer equipment may select a previous menu item B and multiple sub-menu items of B (namely, the menu items of B21, B22, B1, B2) from the remaining portion of menu items, when a menu item matched with the text information can be identified from the selected previous menu item B and the multiple sub-menu items of B, the computer equipment identifies the menu item matched with the text information as a menu item to be jumped to. When the menu item matched with the text information cannot be identified from the selected previous menu item B and the multiple sub-menu items of B, in the step S22-4, the computer equipment selects a top menu item A and multiple sub-menu items of A (namely A1, A2, A11, A12, A21, A22, A23) from the remaining portion of menu items, when the menu item matched with the text information can be identified from the selected previous menu item A and the multiple sub-menu items of A, the computer equipment identifies the menu item matched with the text information as the menu item to be jumped to.

In the first embodiment described above, a portion of menu items that are estimated to have a higher matching degree with the text information are firstly selected from the plurality of menu items of the other party in the call, and then at least one menu item matched with the text information is preferentially identified from the selected portion of menu items. In this way, a matching range can be reduced, meanwhile a successful matching rate is greatly ensured, thereby reducing computer resource consumption.

In a second embodiment, when multiple menu items matched with a text information are acquired according to the text information acquired in the step S1 in conjunction with multiple menu items of other party, a computer equipment acquires a voice inquiry information, thereafter, the computer equipment provides the voice inquiry information to a user, thereafter, the computer equipment receives a feedback information on the voice inquiry information from the user; thereafter, the computer equipment identifies a menu item to be jumped to from the multiple menu items, according to the feedback information.

The voice inquiry information is adapted to remind the user to make a selection among the multiple menu items. In some embodiments, the voice inquiry information is "Call for individual service or family service".

The feedback information is applied to indicate the selection made by the user among the multiple menu items. In some embodiments, the voice inquiry information is "call for individual service or family service", and the feedback information is "individual". In other embodiments, the voice inquiry information is "one is individual service, two is family service, please make a selection", and the feedback information is "one".

The computer equipment may adopt a variety of ways to provide the voice inquiry information to the user. In some embodiments, the computer equipment is the other party in the call, and the computer equipment outputs the voice inquiry information directly based in a call connection between the computer equipment and the user. In some embodiments, the computer equipment is connected with the other party in the call, the computer equipment provides the voice inquiry information to the other party, and the other party provides the voice inquiry information to the user based on a connection between the other party and the user.

The computer equipment may adopt a variety of ways to receive the feedback information on the voice inquiry information from the user. In some embodiments, the computer equipment is the other party in the call, and the computer equipment receives the feedback information on the voice inquiry information from the user directly based in the call connection between the computer equipment and the user. In other embodiments, the computer equipment is connected with the other party in the call, where the other party receives the feedback information based on the connection between the other party and the user, and then the other party provides the feedback information to the computer equipment.

As an example of the present embodiment, a computer equipment acquires the following two menu items "recharge the local mobile phone" and "recharge other mobile phones" matched with a text information, according to the text information "recharge" in conjunction with multiple menu items of other party in a call, then the computer equipment acquires a voice inquiry information "recharge the local mobile phone or other mobile phones", thereafter, the computer equipment provides the voice inquiry information to a user, thereafter, the computer equipment receives a feedback information "recharge the local mobile phone" on the voice inquiry information from the user, thereafter, the computer equipment identifies a menu item "recharge the local mobile phone" in the aforementioned two menu items as a menu item to be jumped to, according to the feedback information.

It is noted that, in the second embodiment, the process for acquiring the multiple menu items by the computer equipment according to the text information in conjunction with the multiple menu items of the other party, may be combined with the aforementioned implementing approach 2) and the first embodiment. In some embodiments, a computer equipment performs a word segmentation on a text information, acquires a semantic information of at least one word, and matches the semantic information with a semantic matching information for at least one of multiple menu items of the other party in a call, so as to acquire multiple menu items. In some embodiments, the computer equipment selects a portion of menu items from multiple menu items of other party, where the portion of menu items are estimated to be highly matched with a text information, according to a predetermined information, and acquires multiple menu items matched with the text information in the portion of menu items, or, a menu item matched with the text information is not acquired from the portion of menu items, while multiple menu items matched with the text information are acquired from the remaining portion of menu items.

In a third embodiment, the step S2 may further include a step S23-1 and a step S23-2.

In the step S23-1, the computer equipment supplements the text information, according to a context information of the call, when it is determined that the menu item to be jumped to is not identified according to the text information.

The context information includes any information related to the context (such as a historical voice information from the user or a historical operation performed by the computer equipment) in the call; optionally, the context information includes but is not limited to:

1) a historical text information acquired during the call.

The historical text information represents a text information acquired before the text information acquired in the step S1.

2) a historically selected menu item corresponding to the historical text information.

The historically selected menu item represents a historical menu item the computer equipment has jumped to based on the historical text information.

It is noted that, the aforementioned context information is for exemplary purpose only, one of ordinary skill in the art should understand, any information related to the context (such as a historical voice information of a user or a historical operation performed by a computer equipment) in the call, should be included in the scope of the context information described in the present invention.

The computer equipment may judge that the menu item to be jumped to is not identified according to the text information in a variety of conditions. In some embodiments, when the semantics of the text information is identified as incomplete (for example, a text information "How to process" lacks of a subject), the computer equipment judges that the menu item to be jumped to is not identified according to the text information. In some embodiments, when the semantics of the text information has ambiguity (for example, the text information is "recharge my mobile phone", while the computer equipment cannot identify whether "my mobile phone" is a local mobile phone), the computer equipment judges that the menu item to be jumped to is not identified according to the text information.

Specifically, when judging that the menu item to be jumped to is not identified according to the text information, the computer equipment supplements the text information according to the context information in the call, so that the supplemented text information can be understood clearly.

In some embodiments, in the step S1, a text information "How to process" is acquired. In the step S23-1, when it is determined that the menu item to be jumped to is not identified according to the text information, the computer equipment supplements the text information according to a historical text information "Introduction to the ten yuan message package" that is closest in time to the text information, and the supplemented text information is "How to process the ten yuan message package".

In some embodiments, in the step S1, a text information "How to process" is acquired. In the step S23-1, when it is determined that the menu item to be jumped to is not identified according to the text information, the computer equipment acquires a historical text information "What is the ten yuan data package" that is closest in time to the text information, and further acquires a historically selected menu item "Introduction to the ten yuan data package" corresponding to the historical text information, then the computer equipment supplements the text information according to the historical text information and the historically selected menu item, thus the supplemented text information is "How to process the ten yuan data package".

It is noted that, the aforementioned examples are only for better illustrating the technical disclosure of the present invention, rather than be limiting the present invention. One of ordinary skill in the art should understand that, any implementation for supplementing a text information according to a context information of a call, when it is determined that the menu item to be jumped to is not identified according to the text information, should be included in the scope of the present invention.

In the step S23-2, the computer equipment identifies the menu item to be jumped to, according to the supplemented text information in conjunction with the multiple menu items of the other party.

Specifically, the implementation for identifying the menu item to be jumped to by the computer equipment according to the supplemented text information in conjunction with the multiple menu items of the other party, is the same or similar to the aforementioned implementation for identifying the menu item to be jumped to by the computer equipment according to the text information in conjunction with the multiple menu items of the other party, which will not be discussed in detail herein.

It is noted that, the third embodiment may be combined with the aforementioned implementing approach 2), the first embodiment and the second embodiment. That is, in the aforementioned implementing approach 2), the first embodiment and the second embodiment, when it is determined that the menu to be jumped to is not identified according to the text information, then the computer equipment may supplement the text information according to the context information of the call.

It is noted that, the aforementioned examples are only for better describing the technical disclosure of the present invention, rather than be limiting the present invention. One of ordinary skill in the art should understand that, any implementation for identifying the menu item to be jumped to according to the supplemented text information in conjunction with the multiple menu items of the other party, should be included in the scope of the present invention.

In the step S3, the computer equipment jumps to the identified menu item, and sends the voice feedback information that corresponds to the menu item and is to be provided to the user.

The computer equipment may adopt a variety of ways to send the voice feedback information that corresponds to the menu item and is to be provided to the user. In some embodiments, the computer equipment is the other party in the call, the computer equipment sends the voice feedback information corresponding to the menu item to the user directly based in the call connection between the computer equipment and the user. In some embodiments, the computer equipment is connected with the other party in the call, the computer equipment provides the voice feedback information to the other party, so that the other party sends the voice feedback information to the user based on the connection between the other party and the user.

As an example of the step S3, the computer equipment jumps to an identified menu item "Introduction to the ten yuan provincial data package", and sends the following voice feedback information corresponding to the menu item to a user: "The ten yuan local data package is a special data offer for XX users, you only need to pay a monthly fee of ten yuan to enjoy . . . ".

It is noted that, the aforementioned examples are only for better illustrating the technical disclosure of the present invention, rather than be limiting the present invention. One of ordinary skill in the art should understand that, any implementation for jumping to an identified menu item, and sending a voice feedback information corresponding to a menu item to a user, should be included in the scope of the present invention.

In a conventional technology, users can acquire self-help voice services provided by suppliers through dialing a relevant service phone number. However, users can only choose a menu item step by step through pressing a button and following a voice prompt of a self-help voice service. For instance, if a user wants to recharge a mobile phone, he needs to perform the following steps. Firstly, dialing the relevant service phone number, then, listening to multiple menu items broadcasted by a voice prompt carefully (e.g., pressing a button one to enter an individual service, pressing a button two to enter a company service, etc.), then, selecting the button one to enter the individual service, then, continuously listening to multiple menu items broadcasted by a new voice prompt and making a selection, then, repeating the aforementioned steps for several times to finish the recharge for the mobile phone.

However, the embodiments of the present disclosure may achieve freely jumping in the multiple menu items of the other party rather than being limited to only jump to a previous menu item of the present menu item or a sub-menu item of the present menu item, and moreover, since it can freely jump among the multiple menu items of the other party, it is possible to jump to a menu item matched with the text information and provide a correct voice feedback information to the user even if the present menu item does not match with the text information. The present disclosure can further identify the menu item to be jumped to more accurately by matching a semantic information for a segmented word of the text information with groups of semantic matching information. The present disclosure can firstly select a portion of menu items from the multiple menu items of the other party in the call according to a predetermined information, where the portion of menu items are estimated to be highly matched with the text information so as to narrow down the matching range, and thus the menu item to be jumped to is identified rapidly, and moreover, when the menu item matched with the text information is not identified from the portion of menu items, a matching range is enlarged or gradually enlarged to avoid matching errors. Furthermore, the menu item to be jumped to is identified by sending a voice inquiry information to the user, when multiple menu items matched with the text information are identified according to the text information, and moreover, due to an interaction with the user existing in the process, the identified menu item to be jumped is accurate. Finally, the text information can be supplemented according to a context information of the call, when it is determined that the menu item to be jumped to is not identified according to the text information, therefore, the supplemented text information can be understood clearly, and the menu item to be jumped to is identified more efficiently and accurately.

FIG. 2 schematically illustrates an apparatus applied to a computer equipment, for providing a voice feedback information to a user in a call according to an embodiment in the present disclosure. The computer equipment can provide a voice service between other party and the user in the call to the other party. The computer equipment can serve as the other party in the call directly, or the computer equipment is connected to the other party in the call. Optionally, the other party in the call is a supplier providing services to the user, such as a telecommunication operator including the China Telecom, the China Unicom, the China Mobile, etc., or any other suppliers providing voice services to the user etc. Optionally, the multiple menu items of the other party in the call, or a hierarchical relationship between the multiple menu items may be pre-stored in the computer equipment, or in any other equipments to which the computer equipment is connected. The menu item may represent one item of the multiple menu items provided by the other party in the call to the user. For instance, the other party in the call is a telecommunication operator, then all of the menu items of the telecommunication operator are stored in the computer equipment.

The apparatus applied to a computer equipment, for providing a voice feedback information to a user in a call (hereinafter referred to as "voice service apparatus"), includes an acquisition device 1, a first identification device 2, and a feedback device 3 according to an embodiment of the present disclosure.

The acquisition device 1 acquires a text information obtained by conducting a voice recognition on a voice information of the user.

Specifically, The method for acquiring the text information by the acquisition device 1 through conducting the voice recognition on the voice information of the user includes but is not limited to:

1) The acquisition device 1 acquires the text information obtained by conducting the voice recognition on the voice information of the user, where the text information is provided by other equipments.

In some embodiments, the computer equipment does not serve as the other party in a call so as not to directly communicate with the user, and instead, other equipments serve as the other party in the call and directly communicate with the user. Other equipments receive the voice information from the user, conduct the voice recognition on the voice information to acquire the text information and send the text information to the computer equipment, thus the acquisition device 1 of the computer equipment directly receives the text information from the other equipments.

In some embodiments, the computer equipment serves as the other party in the call and communicates with the user directly. After receiving the voice information from the user, the computer equipment sends the voice information to other equipments. The other equipments conduct the voice recognition on the voice information to acquire the text information and send the text information to the computer equipment, thus the acquisition device 1 of the computer equipment receives the text information provided by the other equipments.

2) The acquisition device 1 acquires the voice information from the user, conducts the voice recognition on the voice information and acquires a corresponding text information.

Specifically, the acquisition device 1 of the computer equipment may acquire the voice information from the user in a variety of ways. In some embodiments, the computer equipment is the other party in the call, and the acquisition device 1 of the computer equipment receives the voice information from the user directly. In some embodiments, the acquisition device 1 of the computer equipment receives the voice information of the user provided by the other party based on a connection between the computer equipment and the other party in the call.

Specifically, the computer equipment or other equipments may adopt a variety of voice recognition approaches to conduct the voice recognition on the voice information, and acquire the corresponding text information. For instance, the computer equipment may adopt Dynamic Time Warping (DTW) or simulation matching technique to conduct the voice recognition on the voice information to acquire the corresponding text information.

It is noted that the aforementioned examples are only for better illustrating the technical disclosure of the present invention rather than be limiting. One of ordinary skill in the art should understand, any implementation for acquiring a text information obtained by conducting a voice recognition on a voice information of a user, should be included in the scope of the present invention.

The first identification device 2 identifies a menu item to be jumped to, according to the text information in conjunction with multiple menu items of the other party in the call.

The menu item to be jumped to is away from a present menu item by at least two levels.

In some embodiments, FIG. 3 schematically illustrates multiple menu items of other party in a call according to an embodiment of the present disclosure. The multiple menu items of the other party are divided into three levels. The first level includes the following menu items: A, B. In the second level, the menu items A1, A2 are the sub-menu items of the menu item A, and the menu items B1, B2 are the sub-menu items of the menu item B. In the third level, the menu items A11 and A12 are the sub-menu items of the menu item A1, the menu items A21, A22 and A23 are the sub-menu items of the menu item A2, the menu items B11 and B12 are the sub-menu items of the menu item B1, and the menu items B21 and B22 are the sub-menu items of the menu item B2. The present menu item is A, and the menu item to be jumped to is B22, where the menu item to be jumped to is away from the present menu item by two levels.

The first identification device 2 may directly read the multiple menu items stored in a local storage, or the first identification device 2 acquires the multiple menu items stored in a non-local storage.

Optionally, when the other party in the call is a supplier providing services to the user, and the computer equipment may provide services to a plurality of suppliers, the voice service apparatus of the present disclosure further includes a second identification device (not shown in the Figures). The second identification device identifies the multiple menu items corresponding to the other party, according to a number information of the other party in the call.

The number information includes any information indicating the number of the other party in the call, for instance a phone number of the other party in the call, a serial number corresponding to the number of the other party in the call, etc.

In some embodiments, the user starts a call by dialing the phone number of the other party, and the second identification device acquires the number information of the other party based on the connection between the computer equipment and the other party, and identifies multiple menu items corresponding to the number information as the multiple menu items corresponding to the other party.

Specifically, the implementing approach for identifying the menu item to be jumped to by the first identification device 2, according to the text information in conjunction with the multiple menu items of the other party in the call includes but is not limited to:

1) The first identification device 2 matches the text information with the multiple menu items of the other party in the call directly, and identifying a menu item matched with the text information as the menu item to be jumped to.

In some embodiments, the acquisition device 1 acquires a text information "recharge the local device", then the first identification device 2 directly matches the text information with the multiple menu items of the other party in the call, and identifies a menu item "local device recharge" with a highest matching degree as the menu item to be jumped to.

2) In the present implementation, the first identification device 2 further includes a word segmentation device (not shown in the Figures) and a first sub identification device (not shown in the Figures).

The word segmentation device performs a word segmentation on the text information, and acquires a semantic information for at least one segmented word.

The semantic information for the segmented word includes any information that can be recognized by a computer equipment and represent the semantics of the segmented word. Optionally, the semantic information for the segmented word includes but is not limited to at least one of the following items:

a) a synonym for the segmented word and/or a combination of synonyms for the segmented word.

In some embodiments, a semantic information for a segmented word "expense" includes a synonym "billing", a synonym "charge", etc.

b) a homogeneous word for the segmented word and/or a combination of homogeneous words for the segmented word.

The homogeneous word for the segmented word represents a word belonging to the same category as the segmented word.

As an example, if the segmented word is a geographical name, the homogeneous words for the segmented word may include other geographical names. For instance, a semantic information for a segmented word "Shanghai" may include "Beijing", "Tianjin", etc.

c) an entity with a same or similar structure to the segmented word.

The entity with the same or similar structure to the segmented word represents the information structure of the entity is the same or similar to the segmented word. Optionally, the entity may be an expression with a special semantics.

In some embodiments, the segmented word is a special time structure "At 10:45 on Jan. 1, 2013", then the entity with the same or similar structure to the segmented word may be a date semantic expression, such as "At XX(hour): XX(minutes) on XX(Month) XX(Day), XXXX(year)", etc. Such kind of expression with a special semantics may further include a personal name, an address, and a phone number, etc.

It is noted that the aforementioned examples are only to better illustrate the technical disclosure of the present invention, rather than limiting the invention. One of ordinary skill in the art should understand, any information that can be recognized by a computer equipment and adapted to express a semantics of a segmented word, should be included in the scope of the semantic information for the segmented word in the present invention.

Specifically, the word segmentation device may adopt a variety of ways to perform the word segmentation on the text information to acquire the semantic information for at least one segmented word.

In some embodiments, the word segmentation device may adopt a variety of ways (such as a string matching method, a semantic comprehension method etc.) to perform the word segmentation on the text information, and match the segmented word with a word corresponding to a previously acquired semantic information, and then identify a semantic information of a successfully matched word as the semantic information of the segmented word.

In some embodiments, as described in the aforementioned embodiment, after matching the segmented word with the word corresponding to the previously acquired semantic information, and identifying the semantic information of the successfully matched word, the method further includes: processing the semantic information of the successfully matched word in conjunction with a word context of the segmented word in the text information, so as to identify the semantic information of the segmented word etc.

Specifically, the word segmentation device may acquire a semantic information for each segmented word in the text information, or the word segmentation device may only acquire semantic information for a portion of segmented words in the text information. In particular, for some meaningless segmented words (such as "of", "and", etc.), the word segmentation device may not acquire a semantic information for these segmented words.

The first sub identification device matches the acquired semantic information with a semantic matching information for at least one of the multiple menu items of the other party in the call so as to identify the menu item to be jumped to.

The multiple menu items as well as the semantic matching information of the other party in the call are pre-stored in the computer equipment, where each menu item corresponds to a group of semantic matching information. Optionally, each group of semantic matching information includes one semantic matching structure or multiple semantic matching structures. Optionally, one semantic matching structure may be a positive semantic matching structure or a negative semantic matching structure. If the better the positive semantic matching structure is matched, the better a menu item corresponding to the positive semantic matching structure is matched. If the better the negative semantic matching structure is matched, the worse a menu item corresponding to the negative semantic matching structure is matched. The semantics expressed by the group of semantic matching information similar to each other.

One semantic matching structure may be expressed as a semantic expression. Optionally, the semantic matching structure includes but is not limited to at least one of the following items. a) multiple words and a semantic information for at least one word of the multiple words, where the semantic information for the at least one word is similar to the semantic information for the segmented word. In this case, no more description is provided. b) logical relationships between the multiple words, such as a sequential relationship, a constraint relationship (for instance a word is a modifier of another word) among the multiple words, etc.

In some embodiments, the group of semantic matching information includes the following three semantic matching structures "[what] [is] [ten yuan] [local] [data package]", "[what] [service] [is] [ten yuan] [local] [data package]" and "[query for] [ten yuan] [provincial] [data package] [service]". The content in each "[ ]" indicates a word and/or a semantic information for the word.

Optionally, a standard question may be applied to represent a natural language implication similar to all the semantic matching information in the group of semantic matching information. For instance, the standard question for the group of semantic matching information including three semantic matching structures in the aforementioned embodiment, may be "An introduction to the ten yuan data package". Optionally, the standard question may be applied to match with the acquired semantic information, or only be applied for the operator to comprehend the natural language implication similar to all the semantic matching information in the group of semantic matching information.

Specifically, the first sub identification device may adopt a variety of ways to match the acquired semantic information with the semantic matching information for at least one of the multiple menu items of the other party in the call, to identify the menu item to be jumped to.

As an example, the first sub identification device firstly selects at least one menu item from multiple menu items of other party (for instance selecting randomly, or selecting based on the semantic similarity between the menu item and the text information, etc.). Thereafter, for the at least one menu item, the first sub identification device matches a semantic information of each segmented word with a semantic matching information corresponding to the at least one menu item, and identifies a menu item with a highest matching degree as a menu item to be jumped to.

In some embodiment, the acquisition device 1 acquires a text information "How is the local data charged, please?". The word segmentation device performs a word segmentation on a text information, and acquires a semantic information for a segmented word "local", a semantic information for a segmented word "traffic", a semantic information for a segmented word "charge". The first sub identification device firstly identifies a menu item "data expense" and a menu item "provincial data expense", thereafter, the first sub identification device matches the semantic information for the above three segmented words with a group of semantic matching information for the menu item "data expense" and a group of semantic matching information for the menu item "provincial data expense", and identifies the menu item "provincial data expense" with a higher match degree as a menu item to be jumped to.

In another embodiment, in the condition that a voice information has been matched with a semantic matching information, the first sub identification device may further perform the following steps. The first sub identification device selects one menu item from multiple menu items that have not been matched with a semantic information for each segmented word (for instance selecting a menu item randomly, or selecting a sub-menu item of a menu item with a highest match degree in the matched menu items, etc.), and the first sub identification device matches the semantic information for each segmented word with a semantic matching information for the one menu item, when a match degree is higher than a predetermined value, the first sub identification device identifies the one menu item as a menu item to be jumped to, when the match degree is not higher than the predetermined value, the first sub identification device repeats the aforementioned steps, until the menu item to be jumped to is identified.

The implementing approach 2) may supplement the semantics of the text information through a semantic comprehension. In addition, in the implementing approach 2), the multiple menu items also have the semantic matching information for expressing their semantics. Therefore the matching process in the present implementation is more accurate.

It is noted that, the aforementioned examples are for better illustrating the technical disclosure of the present invention, rather than be limiting the present invention. One of ordinary skill in the art should understand, any implementation for identifying a menu item to be jumped to according to a text information in conjunction with multiple menu items of other party in a call, should be included in the scope of the present invention.

Specifically, the first identification device 2 may further include multiple embodiments. The multiple embodiments are presented below.

In a first embodiment, the first identification device 2 may further include a selection device (not shown in the Figures) and a second sub identification device (not shown in the Figures).

The selection device is configured to select a portion of menu items from a plurality of menu items of other party according to a predetermined information, where the portion of menu items are estimated to have a higher matching degree with a text information than a remaining portion of menu items in the plurality of menu items of the other party.

The predetermined information may include any information that is predetermined and can be used to select the portion of menu items. Optionally, the predetermined information may include but is not limited to:

a) the text information acquired by the acquisition device 1.

Optionally, the better the semantics of the text information is matched with semantics of a menu item, the more likely the menu item is estimated to have a higher matching degree with the text information. Specifically, the selection device may perform a natural language analysis to the text information to identify the semantics of the text information quickly.

b) the present menu item for a call between a user and other party in the call.

In some embodiment, identifying the menu item to be jumped to by analyzing the text information may be related to the present menu item of the call. For instance, a text information is "next", "return to previous two levels", "I expect other similar service", etc. Then, a selection device may estimate a portion of menu items that have a higher matching degree with the text information according to a present menu item. In other embodiment, the selection device may estimate the portion of menu items that have a higher matching degree with the text information according to a hierarchical relationship among multiple menu items and/or historical menu items selected by a user during a call.

c) a menu level instruction information from the user. The menu level instruction information includes any information applied to indicate a menu level. For example, in the menu items shown in FIG. 3, a menu level instruction information from a user indicates to make a selection among multiple menu items in a second level. Specifically, if the predetermined information merely includes the menu level instruction information, the selection device may identify all the menu items in a menu level indicated by the menu level instruction information as the portion of menu items. If the predetermined information further includes other information, the selection device may select a portion of menu items from the menu items in the menu level indicated by the menu level instruction information based on the other information.

Specifically, when the predetermined information includes the menu level instruction information, the present embodiment may further include performing a following step before the selection device selecting the portion of menu items: the computer equipment receiving the menu level instruction information from the user.

It should be noted that, the aforementioned predetermined information is for exemplary purpose only. One of ordinary skill in the art should understand that, other information that is predetermined and can be used to select a portion of menu items, should fall within scope of the predetermined information described in the present disclosure.

Specifically, the selection device may perform a semantics analysis to the predetermined information, and estimate a matching degree between each of the plurality of menu items of the other party and the text information by performing a semantic matching between the each menu item of the other party and the predetermined information, and select a portion of menu items that are estimated to have a higher matching degree with the text information than a remaining portion of menu items from the plurality of menu items of the other party.

In some embodiments, a text information acquired by the acquisition device 1 is "What is the ten yuan data package", a present menu item is "provincial plan", then the selection device performs a semantics analysis to the text information and the multiple menu items, and matches the semantics of the text information with the semantics of each of the multiple menu items of the other party in the call, so that the menu items of "data plan" and "provincial data plan" that are estimated to have a higher matching degree with the text information are selected from the multiple menu items of the other party.

In some embodiments, the text information acquired by the acquisition device 1 is "How about the ten yuan local data package"; a menu level indicated by a menu level instruction information from a user includes the menu items of "Service process for the ten yuan provincial data package", "Introduction to the ten yuan provincial data package" and "Query for the using conditions of the ten yuan provincial data package". Then, the selection device may perform a semantics analysis to the text information and the menu level instruction information, and matches the text information with the aforementioned three menu items in the menu level indicated by the menu level instruction information, so as to select a portion of menu items i.e. "Introduction to the ten yuan provincial data package" and "Query for the using conditions of the ten yuan provincial data package", which are estimated to have a higher matching degree with the text information, from the three menu items.

The second sub identification device may be configured to identify one of at least one menu item matched with the text information as the menu item to be jumped to, when it is determined that the at least one menu item matched with the text information can be identified from the selected portion of menu items based on the text information and the selected portion of menu items.

In some embodiments, the acquisition device 1 acquires a text information "How about the ten yuan local traffic?"; the selection device selects a portion of menu items including "Introduction to the ten yuan provincial data package" and "Query for the using conditions of the ten yuan provincial data package", and the second sub identification device may identify a menu item "Introduction to the ten yuan provincial data package" matched with the text information from the selected portion of menu items based on the text information and the portion of menu items, thus the second sub identification device identifies the menu item of "Introduction to the ten yuan provincial data package" as the menu item to be jumped to.

In some embodiment, the second sub identification device determining whether at least one menu item matched with the text information can be identified from the portion of menu items based on the text information and the portion of menu items may include: the second sub identification device performing a word segmentation to the text information, acquiring a semantic information for at least one segmented word, and matching the semantic information of the at least one segmented word with a semantic matching information of each of the selected portion of menu items to determine whether there is at least one menu item matched with the text information.

In another embodiment, the first identification device 2 in the first embodiment in the implementing approach 2) may further include a third sub identification device (not shown in the Figures).

The third sub identification device may be configured to identify the menu item to be jumped to from a remaining portion of menu items in the plurality of menu items of the other party in the call according to the text information and the remaining portion of menu items, when it is determined that a menu item matched with the text information cannot be identified from the selected portion of menu items.

The remaining portion of menu items may refer to menu items in the plurality of menu items of the other party in the call other than the selected portion of menu items.

As an example, FIG. 3 schematically illustrates a plurality of menu items of other party in a call. A portion of menu items selected by the selection device from the plurality of menu items are B11 and B12. When it is determined that a menu item matched with a text information cannot be identified from the menu items of B11 and B12, the third sub identification device identifies a menu item to be jumped to from menu items except for the menu items of B11 and B12 according to the text information and the menu items except for the menu items of B11 and B12.

In some embodiment, the computer equipment may identify the menu item to be jumped to from the remaining portion of menu items in batches.

As another example, a plurality of menu items of other party in a call are shown in FIG. 3. A portion of menu items i.e. B11 and B12 are selected by the selection device from the multiple menu items. When a menu item matched with the text information cannot be identified from the menu items of B11 and B12, the third sub identification device may select a previous menu item B and multiple sub-menu items of B (namely, the menu items of B21, B22, B1, B2) from the remaining portion of menu items, when a menu item matched with the text information can be identified from the selected previous menu item B and the multiple sub-menu items of B, the third sub identification device identifies the menu item matched with the text information as a menu item to be jumped to. When it is determined that the menu item matched with the text information cannot be identified from the selected previous menu item B and the multiple sub-menu items of B, the third sub identification device selects a top menu item A and multiple sub-menu items of A (namely A1, A2, A11, A12, A21, A22, A23) from the remaining portion of menu items, when the menu item matched with the text information can be identified from the selected previous menu item A and the multiple sub-menu items of A, the third sub identification device identifies the menu item matched with the text information as the menu item to be jumped to.

In the first embodiment described above, a portion of menu items that are estimated to have a higher matching degree with the text information are firstly selected from the plurality of menu items of the other party in the call, and then at least one menu item matched with the text information is preferentially identified from the selected portion of menu items. In this way, a matching range can be reduced when a successful matching rate is greatly ensured, thereby reducing the computer resource consumption.

In a second embodiment, the first identification device 2 may include an obtainment device (not shown in the Figures), a supply device (not shown in the Figures), a reception device (not shown in the Figures), and a fifth sub identification device (not shown in the Figures). When multiple menu items matched with a text information are acquired according to the text information acquired by the acquisition device 1 in conjunction with multiple menu items of other party, the obtainment device acquires a voice inquiry information, thereafter, the supply device provides the voice inquiry information to a user, thereafter, the reception device receives a feedback information on the voice inquiry information from the user, thereafter, the fifth sub identification device identifies a menu item to be jumped to from the multiple menu items according to the feedback information.

The voice inquiry information is adapted to remind the user to make a selection among the multiple menu items. In some embodiments, the voice inquiry information is "Call for individual service or family service".

The feedback information is applied to indicate the selection made by the user among the multiple menu items. In some embodiments, the voice inquiry information is "call for individual service or family service", and the feedback information is "individual". In other embodiments, the voice inquiry information is "one is individual service, two is family service, please make a selection", and the feedback information is "one".

The supply device may adopt a variety of ways to provide the voice inquiry information to the user. In some embodiments, the computer equipment is the other party in the call, and the supply device of the computer equipment outputs the voice inquiry information directly based in a call connection between the computer equipment and the user. In some embodiments, the computer equipment is connected with the other party in the call, the supply device of the computer equipment provides the voice inquiry information to the other party, and the other party provides the voice inquiry information to the user based on a connection between the other party and the user.

The reception device may adopt a variety of ways to receive the feedback information on the voice inquiry information from the user. In some embodiments, the computer equipment is the other party in the call, and the reception device of the computer equipment receives the feedback information on the voice inquiry information from the user directly based in the call connection between the computer equipment and the user. In other embodiments, the computer equipment is connected with the other party in the call, where the other party receives the feedback information based on the connection between the other party and the user, and then the other party provides the feedback information to the reception device of the computer equipment.

As an example of the present embodiment, the obtainment device acquires the following two menu items "recharge the local mobile phone" and "recharge other mobile phones" matched with a text information, according to the text information "recharge" in conjunction with multiple menu items of other party in a call, then the obtainment device acquires a voice inquiry information "recharge the local mobile phone or other mobile phones", thereafter, the supply device provides the voice inquiry information to a user, thereafter, the reception device receives a feedback information "recharge the local mobile phone" on the voice inquiry information from the user, thereafter, the fifth sub identification device identifies a menu item "recharge the local mobile phone" in the aforementioned two menu items as a menu item to be jumped to, according to the feedback information.

Specifically, in the second embodiment, the process for acquiring the multiple menu items by the fifth sub identification device according to the text information in conjunction with the multiple menu items of the other party may be combined with the aforementioned implementing approach 2) and the first embodiment. In some embodiments, a computer equipment performs the word segmentation on a text information, acquires a semantic information of at least one word, and matches the semantic information with a semantic matching information for at least one of multiple menu items of other party in a call, so as to acquire multiple menu items. In some embodiments, the computer equipment selects a portion of menu items from multiple menu items of other party, where the portion of menu items are estimated to be highly matched with a text information according to a predetermined information, and acquires multiple menu items matched with the text information in the portion of menu items, or, while a menu item matched with the text information is not acquired from the portion of menu items, multiple menu items matched with the text information are acquired from the remaining portion of menu items.

In a third embodiment, the first identification device 2 may further include a determination device (not shown in the Figures) and a fourth sub identification device (not shown in the Figures).

The determination device supplements the text information according to a context information of the call, when it is determined that the menu item to be jumped to is not identified according to the text information.

The context information includes any information related to the context (such as a historical voice information from the user or a historical operation performed by the computer equipment) in the call; optionally, the context information includes but is not limited to:

1) a historical text information acquired during the call.

The historical text information represents a text information acquired before the acquisition device 1 acquiring the text information.

2) a historically selected menu item corresponding to the historical text information.

The historically selected menu item represents a historical menu item the computer equipment has jumped to based on the historical text information.

It is noted that, the aforementioned context information is for exemplary purpose only, one of ordinary skill in the art should understand, any information related to the context (such as a historical voice information of a user or a historical operation performed by a computer equipment) in the call, should be included in the scope of the context information described in the present invention.

The determination device may judge that the menu item to be jumped to is not identified according to the text information in a variety of conditions. In some embodiments, when the semantics of the text information is identified as incomplete (for example, a text information "How to process" lacks of a subject), the determination device judges that the menu item to be jumped to is not identified according to the text information. In some embodiments, when the semantics of the text information has ambiguity (for example, the text information is "recharge my mobile phone", while the computer equipment cannot identify whether "my mobile phone" is a local mobile phone), the determination device judges that the menu item to be jumped to is not identified according to the text information.

Specifically, when judging that the menu item to be jumped to is not identified according to the text information, the determination device supplements the text information according to the context information in the call, so that the supplemented text information can be understood clearly.

In some embodiments, the acquisition device 1 acquires a text information "How to process". When it is determined that the menu item to be jumped to is not identified according to the text information, the determination device supplements the text information according to a historical text information "Introduction to the ten yuan message package" that is closest in time to the text information, and the supplemented text information is "How to process the ten yuan message package".

In some embodiments, the acquisition device 1 acquires a text information "How to process". When it is determined that the menu item to be jumped to is not identified according to the text information, the determination device acquires a historical text information "What is the ten yuan data package" that is closest in time to the text information, and further acquires a historically selected menu item "Introduction to the ten yuan data package" corresponding to the historical text information, then the determination device supplements the text information according to the historical text information and the historically selected menu item, thus the supplemented text information is "How to process the ten yuan data package".

It is noted that, the aforementioned examples are only for better illustrating the technical disclosure of the present invention, rather than be limiting the present invention. One of ordinary skill in the art should understand that, any implementation for supplementing a text information according to a context information of a call, when it is determined that the menu item to be jumped to is not identified according to the text information, should be included in the scope of the present invention.

The fourth sub identification device identifies the menu item to be jumped to according to the supplemented text information in conjunction with the multiple menu items of the other party.

Specifically, the implementation for identifying the menu item to be jumped to by the fourth sub identification device according to the supplemented text information in conjunction with the multiple menu items of the other party is the same as or similar to the aforementioned implementation for identifying the menu item to be jumped to by the first identification device 2 according to the text information in conjunction with the multiple menu items of the other party, which will not be discussed in detail herein.

It is noted that, the third embodiment may be combined with the aforementioned implementing approach 2), the first embodiment and the second embodiment. That is, in the aforementioned implementing approach 2), the first embodiment and the second embodiment, when it is determined that the menu to be jumped to is not identified according to the text information, the computer equipment may supplement the text information according to the context information of the call.

It is noted that, the aforementioned examples are only for better describing the technical disclosure of the present invention, rather than be limiting the present invention. One of ordinary skill in the art should understand that, any implementation for identifying the menu item to be jumped to according to the supplemented text information in conjunction with the multiple menu items of the other party, should be included in the scope of the present invention.

The feedback device 3 jumps to the identified menu item, and sends the voice feedback information that corresponds to the menu item and is to be provided to the user.

The feedback device 3 may adopt a variety of ways to send the voice feedback information that corresponds to the menu item and is to be provided to the user. In some embodiments, the computer equipment is the other party in the call, the feedback device 3 sends the voice feedback information corresponding to the menu item to the user directly based in the call connection between the computer equipment and the user. In some embodiments, the computer equipment is connected with the other party in the call, the feedback device 3 provides the voice feedback information to the other party, so that the other party sends the voice feedback information to the user based on the connection between the other party and the user.

As an example of the feedback device 3, the feedback device 3 jumps to an identified menu item "Introduction to the ten yuan provincial data package", and sends the following voice feedback information corresponding to the menu item to a user: "The ten yuan local data package is a special data offer for XX users, you only need to pay a monthly fee of ten yuan to enjoy . . . ".

It is noted that, the aforementioned examples are only for better illustrating the technical disclosure of the present invention, rather than be limiting the present invention. One of ordinary skill in the art should understand that, any implementation for jumping to an identified menu item, and sending a voice feedback information corresponding to a menu item to a user, should be included in the scope of the present invention.

In a conventional technology, users can acquire self-help voice services provided by suppliers through dialing a relevant service phone number. However, users can only choose a menu item step by step through pressing a button and following a voice prompt of a self-help voice service. For instance, if a user wants to recharge a mobile phone, he needs to perform the following steps. Firstly, dialing the relevant service phone number, then, listening to multiple menu items broadcasted by a voice prompt carefully (e.g., pressing a button one to enter an individual service, pressing a button two to enter a company service, etc.), then, selecting the button one to enter the individual service, then, continuously listening to multiple menu items broadcasted by a new voice prompt and making a selection, and repeating the aforementioned steps for several times till the recharge for the mobile phone is finished.

However, the embodiments of the present disclosure may achieve freely jumping in multiple menu items of other party rather than being limited to only jumping to a previous menu item of the present menu item or a sub-menu item of the present menu item, and moreover, since it freely jumps in the multiple menu items of the other party, it is possible to jump to a menu item matched with a text information and provide a correct voice feedback information to the user even if a present menu item does not match with the text information. The present disclosure can further identify the menu item to be jumped to more accurately by matching a semantic information for a segmented word of the text information with groups of semantic matching information. The present disclosure can firstly select a portion of menu items from the multiple menu items of the other party in the call according to a predetermined information, where the portion of menu items are estimated to be highly matched with the text information so as to narrow down the matching range, thus the menu item to be jumped to is identified quickly, and moreover, when the menu item matched with the text information is not identified from the portion of menu items, a matching range is enlarged or gradually enlarged to avoid matching errors. Furthermore, the menu item to be jumped to is identified by sending a voice inquiry information to the user, when multiple menu items matched with the text information are identified according to the text information, and moreover, due to there is an interaction with the user in the process, the identified menu item to be jumped to is accurate. Finally, the text information can be supplemented according to a context information of the call, when it is determined that the menu item to be jumped to is not identified according to the text information, therefore, the supplemented text information can be understood clearly, and the menu item to be jumped to is identified more efficiently and accurately.

It is noted that, the present invention can be embodied in a software and/or a combination of the software and a hardware. For instance, each device in the present disclosure can be embodied by application specific integrated circuit (ASIC) or any other similar hardware equipments. In one embodiment, the software program in the present disclosure can be realized by a processor to perform the aforementioned steps and functions. Similarly, the software program (including the relevant data structure) in the present disclosure can be stored in a readable record medium of a computer, for example, RAM memory, magnetic or optical drive or soft magnetic disk and other similar equipments. Furthermore, some steps or functions of the present invention can be achieved using hardware, for instance, a circuit matched with the processor for performing the steps or functions.

It will be evident to those skilled in the art that the invention is not limited to the details of the foregoing exemplary embodiments, and that the present invention may be embodied in other specific forms without departing from the spirit or essential attributed thereof. The foregoing description of the embodiments is therefore to be considered in all respects as illustrative and not restrictive, with the scope of the invention being delineated by the appended claims rather than the foregoing illustrated embodiments, thus any modification and variation falling into the equivalents to which such claims are entitled, should be considered to be within the scope of the present disclosure. In addition, any of the reference numerals in the claims should not be interpreted as a limitation to the present disclosure. Furthermore, use of the verb "include" and its conjugations apparently does not exclude the presence of elements or steps other than those stated in a claim. The indefinite article "a" or "an" preceding an element or step does not exclude the presence of multiple such elements or steps. Multiple units or devices described in the appended claims can be realized by one unit or device by virtue of software or hardware. Use of the ordinal numerals "first", "second" etc. indicates a name, and is not intend to indicate any specific order.

What is claimed is:

1. A method for providing a voice feedback information to a user in a call, adapted to a computer equipment, comprising:

acquiring a text information obtained by conducting a voice recognition on a voice information of the user;

identifying a menu item to be jumped to according to the text information in conjunction with a plurality of menu items of other party in the call, wherein the menu item to be jumped to is away from a present menu item by at least two levels; and jumping to the identified menu item, and sending the voice feedback information that corresponds to the menu item and is to be provided to the user;

wherein identifying the menu item to be jumped to according to the text information in conjunction with the plurality of menu items of the other party in the call comprises:

selecting a portion of menu items from the plurality of menu items of the other party according to a predetermined information, where the portion of menu items are estimated to have a higher matching degree with the text information than a remaining portion of menu items in the plurality of menu items of the other party;

determining whether at least one menu item matched with the text information can be identified from the selected portion of menu items; and if yes, identifying one of the at least one menu item as the menu item to be jumped to; or if not, identifying the menu item to be jumped to from the remaining portion of menu items.

2. The method according to claim 1, wherein the predetermined information comprises at least one of the following items:

the text information;
the present menu item of the call;
a menu level instruction information from the user.

3. The method according to claim 1, wherein selecting the portion of menu items from the plurality of menu items of the other party according to the predetermined information comprises:

performing a semantic analysis to the predetermined information;

estimating a matching degree between each of the plurality of menu items of the other party and the text information by performing a semantic matching between the each menu item of the other party and the predetermined information; and selecting the portion of menu items that are estimated to have a higher matching degree with the text information than the remaining portion of menu items from the plurality of menu items of the other party.

4. The method according to claim 1, wherein determining whether at least one menu item matched with the text information can be identified from the selected portion of menu items comprises:

performing a word segmentation to the text information, and acquiring a semantic information of at least one segmented word; and matching the semantic information of the at least one segmented word with a semantic matching information of each of the selected portion of menu items to determine whether there is at least one menu item matched with the text information.

5. The method according to claim 4, wherein the semantic information of the at least one segmented word comprises at least one of the following items:

a synonym of the at least one segmented word and/or a combination of synonyms of the at least one segmented word;

a homogeneous word of the at least one segmented word and/or a combination of homogeneous words of the at least one segmented word;

an entity with a same or similar structure to the at least one segmented word.

6. The method according to claim 1, wherein identifying a menu item to be jumped to according to the text information in conjunction with a plurality of menu items of the other party in the call further comprises:

supplementing the text information according to a context information of the call, when it is determined that a menu item to be jumped to is not identified from the plurality of menu items of the other party according to the text information; and identifying the menu item to be jumped to according to the supplemented text information in conjunction with the plurality of menu items of the other party.

7. The method according to claim 6, wherein the context information comprises at least one of the following items:

a historical text information acquired during the call;
a historically selected menu item corresponding to the historical text information.

8. The method according to claim 1, wherein identifying a menu item to be jumped to according to the text information in conjunction with a plurality of menu items of the other party in the call further comprises:

acquiring a voice inquiry information, when it is determined that more than one menu item matched with the text information are identified from the selected portion of menu items, wherein the voice inquiry information is adapted to remind the user to make a selection among the more than one menu item;

providing the voice inquiry information to the user;

receiving a feedback information of the user on the voice inquiry information, wherein the feedback information is applied to indicate the selection made by the user among the more than one menu item; and identifying one menu item to be jumped to from the more than one menu item according to the feedback information.

9. The method according to claim 1, further comprising:

identifying the plurality of menu items of the other party in the call according to a number information of the other party in the call.

10. The method according to claim 1, wherein the menu item to be jumped to is identified from the remaining portion of menu items in batches.

11. An apparatus for providing a voice feedback information to a user in a call, applied to a computer equipment, comprising:

an acquisition device, configured to acquire a text information obtained by conducting a voice recognition on a voice information of the user;

a first identification device, configured to identify a menu item to be jumped to according to the text information in conjunction with a plurality of menu items of other party in the call, wherein the menu item to be jumped to is away from a present menu item by at least two levels;

a feedback device, configured to jump to the identified menu item, and send the voice feedback information that corresponds to the menu item and is to be provided to the user;

wherein the first identification device comprises:

a selection device, configured to select a portion of menu items from the plurality of menu items of the other party according to a predetermined information, where the portion of menu items are estimated to have a higher matching degree with the text information than a remaining portion of menu items in the plurality of menu items of the other party;

a second sub identification device, configured to, determine whether at least one menu item matched with the text information can be identified from the selected portion of menu items, and identify one of the at least one menu item as the menu item to be jumped to when it is determined yes; and a third sub identification device, configured to, when it is determined by the second sub identification device that, a menu item matched with the text information cannot be identified from the selected portion of menu items, identify the menu item to be jumped to from the remaining portion of menu items.

12. The apparatus according to claim 11, wherein the predetermined information comprises at least one of the following items:

the text information;

the present menu item of the call;

a menu level instruction information from the user.

13. The apparatus according to claim 11, wherein the selection device is further configured to:

perform a semantic analysis to the predetermined information;

estimate a matching degree between each of the plurality of menu items of the other party and the text information by performing a semantic matching between the each menu item of the other party and the predetermined information; and select the portion of menu items that are estimated to have a higher matching degree with the text information than the remaining portion of menu items.

14. The apparatus according to claim 11, wherein the second sub identification device is further configured to:

perform a word segmentation to the text information, and acquire a semantic information of at least one segmented word; and match the semantic information of the at least one segmented word with a semantic matching information of each of the selected portion of menu items to determine whether there is at least one menu item matched with the text information.

15. The apparatus according to claim 14, wherein the semantic information of the at least one segmented word comprises at least one of the following items:

a synonym of the at least one segmented word and/or a combination of synonyms of the at least one segmented word;

a homogeneous word for the at least one segmented word and/or a combination of homogeneous words of the at least one segmented word;

an entity with a same or similar structure to the at least one segmented word.

16. The apparatus according to claim 11, wherein the first identification device further comprises:

a determination device, configured to supplement the text information according to a context information of the call, when it is determined that the menu item to be jumped to is not identified from the plurality of menu items of the other party according to the text information;

a fourth sub identification device, configured to identify the menu item to be jumped to according to the supplemented text information in conjunction with the plurality of menu items of the other party.

17. The apparatus according to claim 16, wherein the context information comprises at least one of the following items:

a historical text information acquired during the call;

a historically selected menu item corresponding to the historical text information.

18. The apparatus according to claim 11, wherein the first identification device further comprises:

an obtainment device, configured to acquire a voice inquiry information, when it is determined that more than one menu item matched with the text information are identified from the selected portion of menu items, wherein the voice inquiry information is adapted to remind the user to make a selection among the more than one menu item;

a supply device, configured to provide the voice inquiry information to the user;

a reception device, configured to receive a feedback information of the user on the voice inquiry information, wherein the feedback information is applied to indicate the selection made by the user among the more than one menu item;

a fifth sub identification device, configured to identify one menu item to be jumped to from the more than one menu item according to the feedback information.

19. The apparatus according to claim 11, wherein the apparatus further comprises:

a second identification device, configured to identify the plurality of menu items of the other party according to a number information of the other party in the call.

20. The apparatus according to claim 11, wherein the apparatus is further configured to identify the menu item to be jumped to from the remaining portion of menu items in batches.

* * * * *